(12) United States Patent
Hoshino

(10) Patent No.: US 7,692,032 B2
(45) Date of Patent: Apr. 6, 2010

(54) THERMAL CONDUCTIVE SILICONE COMPOSITION

(75) Inventor: Chisato Hoshino, Tokyo (JP)

(73) Assignee: Momentive Performance Materials Japan LLC, Tokyo (JP)

( * ) Notice: Subject to any disclaimer, the term of this patent is extended or adjusted under 35 U.S.C. 154(b) by 864 days.

(21) Appl. No.: 10/567,587

(22) PCT Filed: Sep. 29, 2004

(86) PCT No.: PCT/JP2004/014679

§ 371 (c)(1),
(2), (4) Date: Aug. 24, 2006

(87) PCT Pub. No.: WO2005/030874

PCT Pub. Date: Apr. 7, 2005

(65) Prior Publication Data

US 2007/0185259 A1      Aug. 9, 2007

(30) Foreign Application Priority Data

Sep. 29, 2003   (JP) ............................. 2003-337806

(51) Int. Cl.
  *C07F 7/00*  (2006.01)
(52) U.S. Cl. ............... 556/450; 556/453; 524/588; 524/701; 524/786; 524/779; 528/35; 528/37
(58) Field of Classification Search ............... 524/588, 524/779, 786, 701; 556/453, 450, 431, 400; 528/35, 37

See application file for complete search history.

(56) References Cited

U.S. PATENT DOCUMENTS

| | | | |
|---|---|---|---|
| 5,246,703 A | 9/1993 | Durfee | |
| 5,359,109 A * | 10/1994 | Ritscher et al. | 556/434 |
| 5,420,189 A | 5/1995 | Kishita et al. | |
| 6,005,131 A | 12/1999 | Jentsch et al. | |
| 6,025,435 A | 2/2000 | Yamakawa et al. | |
| 6,235,832 B1 * | 5/2001 | Deng et al. | 524/525 |

FOREIGN PATENT DOCUMENTS

| | | |
|---|---|---|
| JP | 51 55870 | 5/1976 |
| JP | 64 49959 | 2/1989 |
| JP | 2 97559 | 4/1990 |
| JP | 3 47841 | 2/1991 |
| JP | 2623380 | 12/1992 |
| JP | 5 255359 | 10/1993 |
| JP | 6-271773 | 9/1994 |
| JP | 6-329916 | 11/1994 |
| JP | 8-92371 | 4/1996 |
| JP | 8-325457 | 12/1996 |
| JP | 9-25411 | 1/1997 |
| JP | 9-208591 | 8/1997 |
| JP | 2000-1616 | 1/2000 |
| JP | 2000-256558 | 9/2000 |
| JP | 2000-327917 | 11/2000 |
| JP | 2001-348483 | 12/2001 |
| JP | 2003-213133 | 7/2003 |
| JP | 2004-122664 | 4/2004 |

* cited by examiner

*Primary Examiner*—Randy Gulakowski
*Assistant Examiner*—Olatunde S Ojurongbe
(74) *Attorney, Agent, or Firm*—Flynn, Thiel, Boutell & Tanis, P.C.

(57) ABSTRACT

The present invention relates to a thermal conductive silicone composition containing a siloxane which contains a hydrolytic group represented by the formula (1):

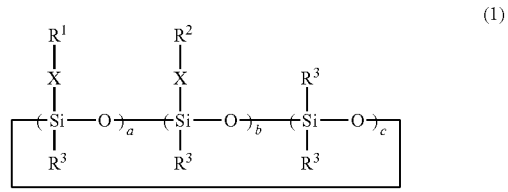

where
$R^1$ is a group containing an alkoxysilyl group having 1 to 4 carbon atoms,
$R^2$ is a siloxy represented by the following formula (2) or a monovalent hydrocarbon group having 6 to 18 carbon atoms,
X is a divalent hydrocarbon group having 2 to 10 carbon atoms,
a and b are integers of 1 or more,
c is an integer of 0 or more,
the sum of a+b+c is an integer of 4 or more,
$R^3$ is a monovalent hydrocarbon group having 1 to 6 carbon atoms or a hydrogen atom, provided that $R^3$s may be the same as or different from each other;

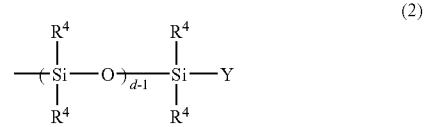

$R^4$ is a monovalent hydrocarbon group having 1 to 12 carbon atoms,
Y is a group selected from a methyl group, a vinyl group and $R^1$, and
d is an integer of 2 to 500.

4 Claims, No Drawings

THERMAL CONDUCTIVE SILICONE COMPOSITION

TECHNICAL FIELD

The present invention relates to a thermal conductive silicon composition.

BACKGROUND ART

The heat dissipation of electronic devices, Integrated Circuit (IC) elements and the like is an enormous challenge to the microelectronic industry. Heat conductive greases and thermal conductive sheets have been used to prevent heat accumulation in heating elements of electronic parts typified by power transistors, ICs and CPUs. The advantage of thermal conductive greases is that they can be applied to conform to the shape of the electronic parts. However, one key issue with thermal conductive greases is that, over time, oil bleed-out may occur which contaminates other parts/components on the printed circuit. As for thermally conductive sheets, their advantage is that they do not contaminate other parts and are free from the bleeding of oil. However, they are less adhesive than greases and therefore, measures are taken to drop the hardness of the thermal-conductive sheets, thereby improving their adhesion (JP-A 1-49959 and JP-B 2623380).

Silicone rubber has been used as a thermally conductive sheet having excellent properties. When fillers, having a higher thermal conductivity than silicone for a binder, such as a silica powder, alumina, boron nitride, aluminum nitride or magnesium oxide is added, the thermal conductivity increases for the silicone rubber.

However, when it is intended to include a filler in silicone which is to be a binder, the viscosity of the compound will increase, resulting in poor flowability during the application of the material. Therefore, depending on the type and amount of filler incorporated into the silicone, the processing time to uniformly dispense the material will increase. To improve the flowability of the material, various surface-treating agents (e.g., alkoxysilane, straight-chain alkoxy oligomer and straight-chain alkoxy oligomer containing a vinyl group (JP-A 2000-1616, JP-A 2000-256558 and JP-A 2003-213133) were investigated. In spite of this, studies had shown that there were issues in the heat resistance and challenge of producing the treating agent. Also, the resultant surface-treated filler showed minimal improvement in flowability. Recent electronic parts generate a large amount of heat with the output amount thereof. A heat-discharging member is required to have a large thermal conductivity. A thermal conductive filler is required in a large amount. Such a demand is raised. Therefore, a novel way to improve the flowability of thermally conductive silicone needs to be investigated to improve the processability of the material.

DISCLOSURE OF THE INVENTION

Having the above-shown prior problems, the objective of the present invention is to provide a densely filled thermally conductive silicone composition which does not have impaired flowability and has excellent processability.

The inventors of the present invention have made earnest studies to attain this object and, as a result, found that a siloxane containing a specific hydrolytic group has an effect on the surface treatment of a thermal conductive filler and also determined that the flowability of the compound is not compromised and high processability can be provided, even if the siloxane is compounded in large amounts. This siloxane can be used widely and effectively as a radiating member for various electronic devices, integrated circuit elements and the like, to complete the present invention.

Accordingly, the present invention relates to a thermal conductive silicone composition comprising a siloxane containing a hydrolytic group represented by the formula (1):

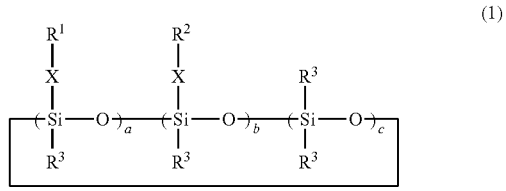

where $R^1$ is a group containing an alkoxysilyl group having 1 to 4 carbon atoms;

$R^2$ is a siloxy compound represented by the following formula (2) or a monovalent hydrocarbon group having 6 to 18 carbon atoms;

X is a divalent hydrocarbon group having 2 to 10 carbon atoms;

a and b are integers of 1 or more;

c is an integer of 0 or more;

the sum of a+b+c is an integer of 4 or more;

$R^3$ is a monovalent hydrocarbon group having 1 to 6 carbon atoms or a hydrogen atom, provided that $R^3$s may be the same or different;

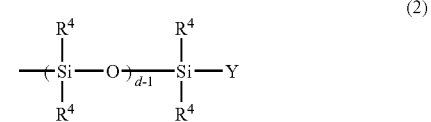

$R^4$ is a monovalent hydrocarbon group having 1 to 12 carbon atoms;

Y is a group selected from a methyl group, a vinyl group and $R^1$; and d is an integer of 2 to 500.

BEST MODE FOR CARRYING OUT THE INVENTION

The present invention will be hereinafter explained below. The hydrolytic group-containing siloxane represented by the formula (1) is mostly characterized by the presence of a cyclic structure. When a siloxane having such a cyclic structure is used, a large number of hydrolytic groups can be introduced in the cyclic structure and also the positions of these groups are concentrated. Therefore, efficiency in the processing of the thermal conductive filler is high and it is expected that the filler can be filled more densely. Also, the siloxane also has the advantage that it can be produced easily by an addition reaction of a cyclic siloxane containing a hydrogen group, a siloxane having a vinyl group at one terminal and a silane compound containing a vinyl group and a hydrolytic group.

$R^1$ is a hydrolytic functional group containing an alkoxysilyl group having 1 to 4 carbon atoms. As the functional group, those having the following structures are exemplified.

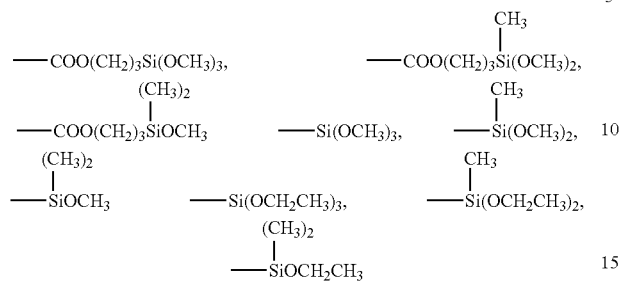

$R^2$ is selected from the group comprising oligosiloxys or long-chain alkyls. In the case of oligosiloxys, they are described as those represented by the formula (2).

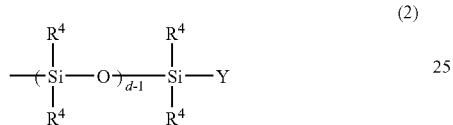

(2)

The number d is in a range of from 2 to 500 and preferably is 4 to 400. When the number is smaller than 2, the effect on the flowability of the compound is reduced even if the thermal conductive filler is compounded and no effect obtained by adding a large amount of the filler is expected. When the number exceeds 500, the viscosity of the siloxane itself is increased. Therefore, even if the thermal conductive filler is compounded, the effect of the filler on the flowability of the compound is reduced. Also, $R^4$ represents a monovalent hydrocarbon group having 1 to 12 carbon atoms and examples of $R^4$ include an alkyl group, perfluoroalkyl group and aryl group. $R^4$ is preferably a methyl group because of synthetic easiness. Y represents a group selected from a methyl group, vinyl group and $R^1$. Y is preferably a methyl group or a vinyl group because of synthetic easiness.

Also, when $R^2$ is a long-chain alkyl group, the number of carbons is in a range of from 6 to 18 and preferably is 6 to 14. If the number of carbons is less than 6, the effect of the thermal conductive filler on the flowability of the compound is reduced, even if the filler is compounded and, therefore, no effect obtained by adding a large amount of the filler is expected. If the number of carbons exceeds 18, the conductive filler is put into a solid state, so that its handling is inconvenient and it becomes difficult to disperse the filler uniformly.

$R^1$ and $R^2$ are combined with the cyclic siloxane through X (divalent hydrocarbon group having 2 to 10 carbon atoms). Examples of X include alkylene groups such as —$CH_2CH_2$—, —$CH_2CH_2CH_2$—, —$CH_2CH_2CH_2CH_2CH_2CH_2$—, —$CH_2CH(CH_3)$— and —$CH_2CH(CH_3)CH_2$—.

$R^3$ represents a hydrocarbon group having 1 to 6 carbon atoms or a hydrogen atom, provided that each $R^3$ may be the same as or different from each other. $R^3$ is preferably a methyl group or a hydrogen group. a and b are respectively an integer of 1 or more and preferably a number of 1 or 2. c is an integer of 0 or more and preferably 0 or 1. The sum of a+b+c is an integer of 4 or more and is preferably 4 from the viewpoint of synthetic easiness. Typical examples of such a hydrolytic group-containing siloxane include the following compounds, which are not, however, intended to be limiting of the present invention.

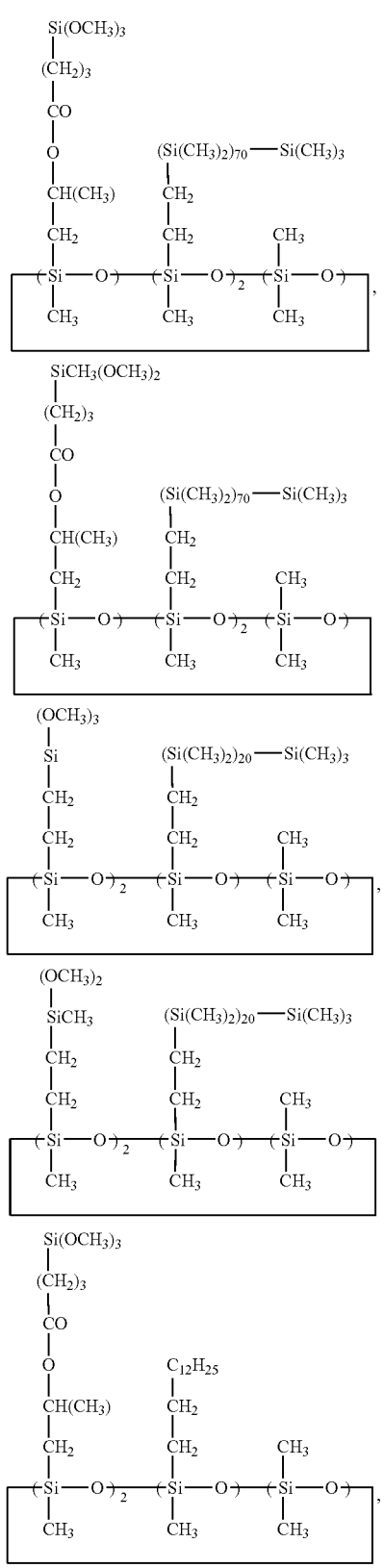

-continued

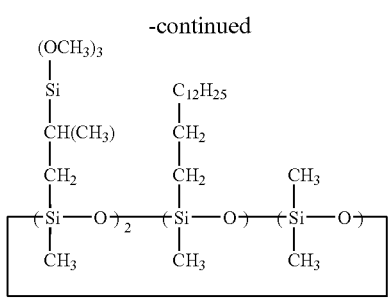

The amount of the hydrolytic siloxane to be compounded must be one part by weight or more based on 100 parts by weight of the base polymer having a curable functional group. When the amount is less than one part by weight, the surface-treating effect of the thermal-conductive filler is decreased and the filler cannot be compounded densely. Also, if the amount of the hydrolytic siloxane is excessive, this adversely affects the properties of the cured composition and the amount is therefore preferably 5 to 500 parts by weight.

There are a variety of thermally conductive fillers that can be included in a silicone system to improve the thermal conductivity. Some examples of thermally conductive fillers used in a silicone system are: alumina, magnesium oxide, boron nitride, aluminum nitride, silica powder, metal powder, diamond, aluminum hydroxide and carbon, and those obtained by surface-treating these compounds. Of the fillers noted, Alumina is particularly preferable. These compounds may be used regardless of type insofar as they have an average particle diameter of 0.1 μm or more. Also, if two or more types are combined and closely packed, these fillers may be compounded densely.

The amount of these fillers to be compounded is 10 to 3000 parts by weight based on a total of 100 parts by weight of the base polymer containing the hydrolytic group-containing siloxane and a curable functional group. When the amount is particularly in a high packing range from 100 to 2800 parts by weight, the effect of the invention is significantly produced.

Such a thermal conductive silicone composition is preferably an addition reaction-curable type from the viewpoint of productivity and operability.

This addition reaction-curable type polyorganosiloxane is well known to be one comprising (a) a vinyl group-containing polyorganosiloxane which is a base polymer, (b) a hydrogen group-containing polyorganosiloxane which is a crosslinking agent and (c) a platinum compound which is a curing catalyst.

In the vinyl group-containing polyorganosiloxane which is the component (a), at least an average of 0.5 or more vinyl groups among the organic groups connected to silicon atoms in one molecule must be contained. When the number of vinyl groups is less than 0.5, components which do not participate in a crosslinking reaction are increased and the product cannot be sufficiently cured. When the number of vinyl groups is 0.5 or more, a cured product can be obtained. However, when the number of vinyl groups is excessive, the heat resistance of the cured product is lowered. Therefore, the number of vinyl groups is preferred to be between 0.5 to 2.0. This vinyl group may be bound to any of the molecular chain terminals and molecular chain side terminals. On the other hand, the vinyl group is preferred to exist at the molecular chain terminal to prevent the reduction of the curing rate and deterioration of the heat resistance of the cured product.

Other functional groups in the vinyl group-containing polyorganosiloxane are monovalent substituted or unsubstituted hydrocarbon groups. Examples of these functional groups include alkyl groups such as methyl, ethyl, propyl, butyl, hexyl and dodecyl; aryl groups such as phenyl; aralkyl groups such as 2-phenylethyl and 2-phenylpropyl; and substituted hydrocarbon groups such as 3,3,3-trifluoropropyl. Generally, a methyl group and phenyl group are preferable from the viewpoint of synthetic easiness.

This vinyl group-containing polyorganosiloxane may have either a straight-chain structure or a branched structure. The viscosity of the polyorganosiloxane is preferred to be between 0.01 to 50 Pa·s at 23° C. though no particular limitation is imposed on it.

Generally, it is well known that the vinyl group-containing polyorganosiloxane is obtained by running an equilibrium polymerization reaction between a cyclic siloxane such as hexamethylcyclotrisiloxane, octamethylcyclotetrasiloxane or tetravinyltetramethylcyclotetrasiloxane and an organosiloxane having a $R_3SiO_{0.5}$ (R is a monovalent hydrocarbon group) unit in the presence of a proper catalyst such as an alkali or an acid, followed by carrying out a neutralizing step and a step of removing an excess low-molecular siloxane.

The hydrogen group-containing polyorganosiloxane which is the component (b) is a component which is to be a crosslinking agent. The hydrogen group-containing polyorganosiloxane is compounded in such an amount that the number of hydrogen atoms is 0.2 to 5.0 based on one vinyl group of the component (a). If the number of hydrogen atoms is less than 0.2, the progress of curing is insufficient whereas if the number of hydrogen atoms exceeds 5, the cured product is too hard and also this adversely affects the material properties after curing. Also, it is necessary that the number of hydrogen groups bound with a silicon atom is at least 2 or more. However, there is no particular limitation to other conditions, organic groups other than a hydrogen group, bound positions, degree of polymerization, structures and the like. Also, two or more hydrogen group-containing polyorganosiloxanes may be used.

The platinum compound as the component (c) is a curing catalyst which promotes a reaction between a vinyl group of the component (a) and a hydrogen group of the component (b) to obtain a cured product. Examples of the platinum compound include chloroplatinic acid, a platinum olefin complex, a platinum vinylsiloxane complex, a platinum phosphorous complex, a platinum alcohol complex and platinum black. The amount of the platinum compound to be compounded is 0.1 to 1000 ppm as the platinum element based on the vinyl group-containing polyorganosiloxane as the component (a). If the amount is less than 0.1 ppm, the composition is insufficiently cured whereas even if the amount exceeds 1000 ppm, particularly, an improvement in curing rate cannot be expected.

As to a method of preparing such a compound formulated with the thermal conductive filler, the compound may be prepared directly from the hydrolytic siloxane, the base polymer having a curable functional group and the filler by using a kneader or may be prepared by first providing a surface treating agent to the hydrolytic siloxane and the filler and then by dispersing the above surface-treated materials in the base polymer having a curable functional group. Also, heating, pressure-reduction or other known treatments may be carried out according to need.

The composition of the present invention may be appropriately compounded with the following as it does not appear to have an effect on the present invention: reaction inhibitor, pigments, flame retardant, adhesion-imparting agent, heat resistance-imparting agent and organic solvents.

If the hydrolytic siloxane of the present invention is used, a thermal conductive filler can be compounded densely, the flowability of the compound at this time is not made poor and high processability can be imparted. Therefore, the hydrolytic siloxane can be used widely and effectively as a radiating member for various electronic devices, integrated circuit elements and the like.

EXAMPLES

Examples of the present invention are shown below. In the following Examples and Comparative Examples, all designations of parts indicate parts by weight.

Example 1

Comparative Example 1

A component A: a polydimethylsiloxane having a viscosity of 300 cP at 23° C. and containing vinyl groups at both terminals, 50 parts, component B: the hydrolytic polysiloxane represented by the following formula (B-1), 50 parts and component C: alumina (C-1) having an average particle diameter of 8 μm, 1200 parts, alumina (C-2) having an average particle diameter of 0.4 μm, 150 parts and alumina (C-3) having an average particle diameter of 0.2 μm, 150 parts, were kneaded by a kneader of a predetermined means to prepare a compound. Further, a component D: as a crosslinking agent, 0.16 parts of a methylhydrogen polysiloxane which has a trimethylsilyl group at both terminals and in which the side-chain part is constituted of 53 mol % of a methylhydrogen group and 47 mol % of a dimethyl group, a component E: as a reaction retarder, 0.03 parts of 1-ethynyl-1-cyclohexanol and a component F: as a curing catalyst, 0.016 parts of a vinylsiloxane complex compound part of chloroplatinic acid (amount of platinum: 1.85%) were added to the compound and the mixture was mixed uniformly.

As to this composition, the viscosity of the compound was measured and the state of this compound was observed at 23° C. Further, this compound was filled in a mold having a predetermined size and cured under heating at 150° C. for one hour to measure its thermal conductivity and the state was observed. The results obtained are shown in Table 1. Also, for comparison, a sample to which no hydrolytic siloxane was added was prepared and evaluated in the same manner as above.

Examples 2 and 3

In Example 1, the ratio of the component A to the component B was changed to prepare a compound which is then evaluated in the same manner as in Example 1.

Examples 4 and 5

A compound was prepared and evaluated in the same manner as in Example 1 except that, in Example 1, compounds represented by the following formulae (B-2) and (B-3) were respectively used as the hydrolytic siloxane as the component B.

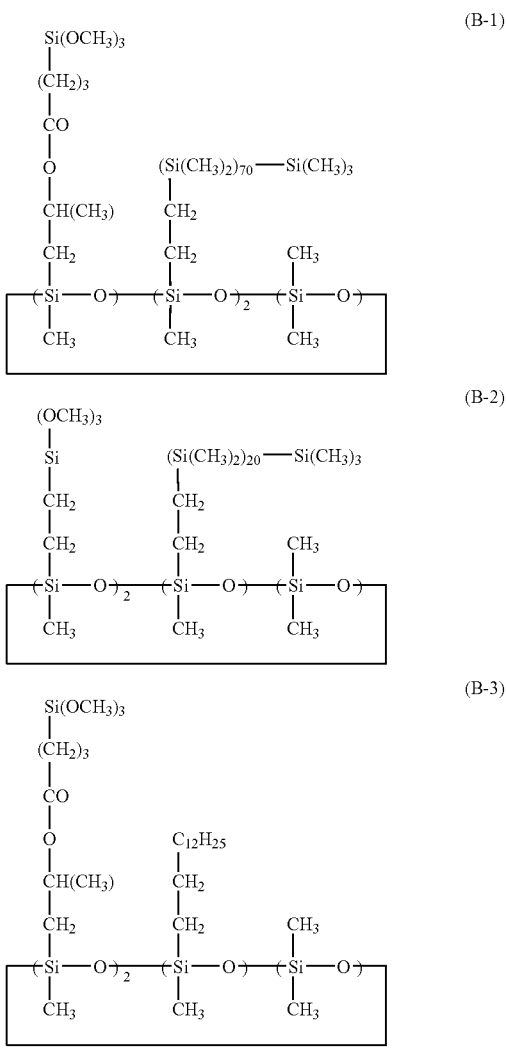

TABLE 1

|  |  | Example 1 | Example 2 | Example 3 | Example 4 | Example 5 | Comparative Example 1 |
|---|---|---|---|---|---|---|---|
| Component A |  | 50 | 80 | 30 | 50 | 50 | 100 |
| Component B | B-1 | 50 | 20 | 70 | — | — | — |
|  | B-2 | — | — | — | 50 | — | — |
|  | B-3 | — | — | — | — | 50 | — |
| Component C | C-1 | 1200 | 1200 | 1200 | 1200 | 1200 | 1200 |
|  | C-2 | 150 | 150 | 150 | 150 | 150 | 150 |
|  | C-3 | 150 | 150 | 150 | 150 | 150 | 150 |
| Component D |  | 0.16 | 0.22 | 0.11 | 0.16 | 0.16 | 0.16 |
| Component E |  | 0.03 | 0.03 | 0.03 | 0.03 | 0.03 | 0.03 |
| Component F |  | 0.016 | 0.016 | 0.016 | 0.016 | 0.016 | 0.016 |
| Viscosity | Pa·s | 790 | 2300 | 760 | 750 | 1250 | non-measurable |

TABLE 1-continued

| | | Example 1 | Example 2 | Example 3 | Example 4 | Example 5 | Comparative Example 1 |
|---|---|---|---|---|---|---|---|
| State of the compound | | fluid | fluid | fluid | fluid | fluid | compound cannot be prepared |
| Thermal conductivity | W/mK | 5.0 | 4.9 | 4.9 | 5.0 | 4.9 | — |
| State of the cured product | | uniform rubber state | uniform rubber state | uniform rubber state | uniform rubber state | uniform rubber state | — |

As shown in Table 1, it was confirmed that in the case of the thermal conductive silicone composition containing a hydrolytic siloxane, the flowability of the compound did not deteriorate even if a thermal conductive filler was added densely and the compound could be processed afterward. On the other hand, in the case of the compositions containing no hydrolytic siloxane, even the preparation of a compound was impossible and it was therefore impossible to process the compound afterward.

The invention claimed is:

1. A thermal conductive silicone composition comprising 1 part by weight of a siloxane containing a hydrolytic group represented by the formula (1), based on 100 parts by weight of a base polymer having a curable functional group:

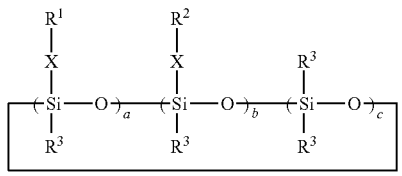

(1)

where
   $R^1$ is a group containing an alkoxysilyl group having 1 to 4 carbon atoms;
   $R^2$ is a siloxy group represented by the following formula (2) or a monovalent hydrocarbon group having 6 to 18 carbon atoms;
   X is a divalent hydrocarbon group having 2 to 10 carbon atoms;
   a and b are integers of 1 or more;
   c is an integer of 0 or more;
   the sum of a+b+c is an integer of 4 or more;
   $R^3$ is a monovalent hydrocarbon group having 1 to 6 carbon atoms or a hydrogen atom, provided that each $R^3$ may be the same as or different from each other;

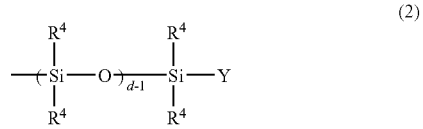

(2)

$R^4$ is a monovalent hydrocarbon group having 1 to 12 carbon atoms;
   Y is a group selected from a methyl group, a vinyl group and $R^1$; and
   d is an integer of 2 to 500.

2. The composition of claim 1, further comprising a thermal conductive filler in an amount of 10 to 3000 parts by weight based on a total of 100 parts by weight of the hydrolytic group-containing siloxane and the base polymer having the curable functional group.

3. The composition of claim 2, wherein the thermal conductive filler is selected from alumina, magnesium oxide, boron nitride, aluminum nitride, silica powder, metal powder, diamond, aluminum hydroxide and, carbon and surface-treated products of these compounds.

4. The composition of claim 1, wherein the thermal conductive silicone composition is an addition reaction-curable type.

* * * * *